(12) United States Patent
St. Louis et al.

(10) Patent No.: US 7,296,365 B1
(45) Date of Patent: Nov. 20, 2007

(54) METHOD AND SYSTEM FOR INSERTING A PROBE

(75) Inventors: Robert T. St. Louis, Greenville, SC (US); Tyler Jacobs, Greenville, SC (US); Elias Marquez, Queretaro (MX); Heidi Channell, Easley, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/604,413

(22) Filed: Nov. 27, 2006

(51) Int. Cl.
*G01D 21/00* (2006.01)
*G01B 21/06* (2006.01)

(52) U.S. Cl. ............... 33/613; 33/644; 33/655; 33/832

(58) Field of Classification Search .......... 33/613, 33/644–645, 655, 719, 832, 836
See application file for complete search history.

(56) References Cited

U.S. PATENT DOCUMENTS

| | | | |
|---|---|---|---|
| 6,195,577 B1 * | 2/2001 | Truwit et al. ............... 600/411 |
| 6,694,832 B1 | 2/2004 | Gleeson ..................... 73/866.5 |
| 7,188,433 B2 * | 3/2007 | Boge et al. .................. 33/706 |
| 7,261,796 B2 * | 8/2007 | Byrnes et al. ................ 33/613 |
| 2005/0115095 A1 * | 6/2005 | Kurfiss et al. ................ 33/613 |

* cited by examiner

*Primary Examiner*—Yaritza Guadalupe-McCall
(74) *Attorney, Agent, or Firm*—Dale J. Davis; Ernest G. Cusick; Frank Landgraff

(57) ABSTRACT

A system for inserting a probe into a turbomachine. The system may include a male measurement fixture having a shaft and a female portion a housing for receiving the male measurement fixture. The male measurement fixture may include: a tip portion, an indicator, and a target zone.

20 Claims, 6 Drawing Sheets

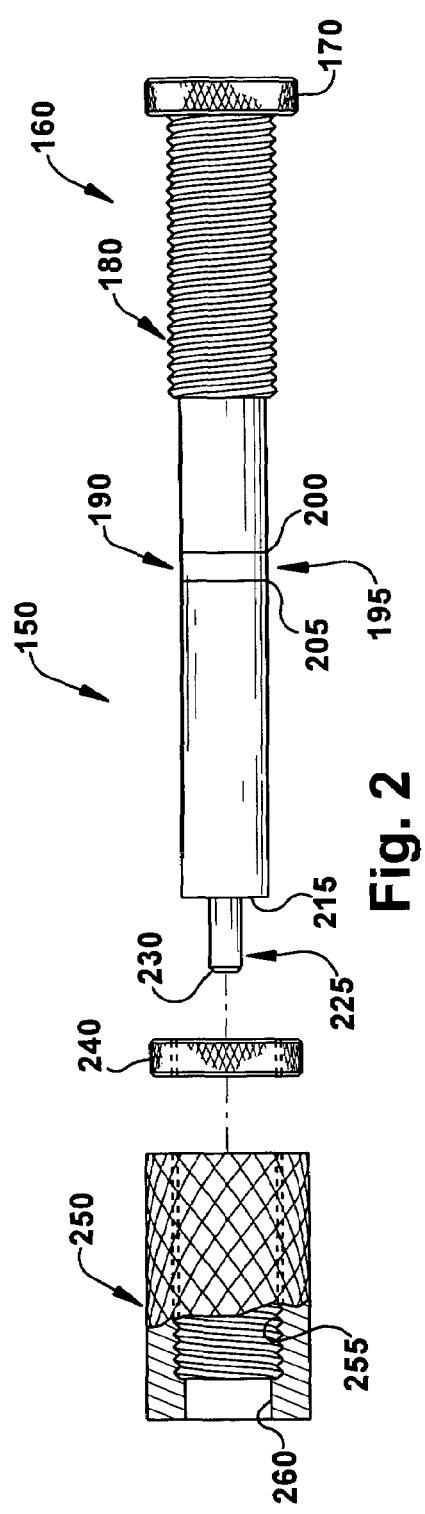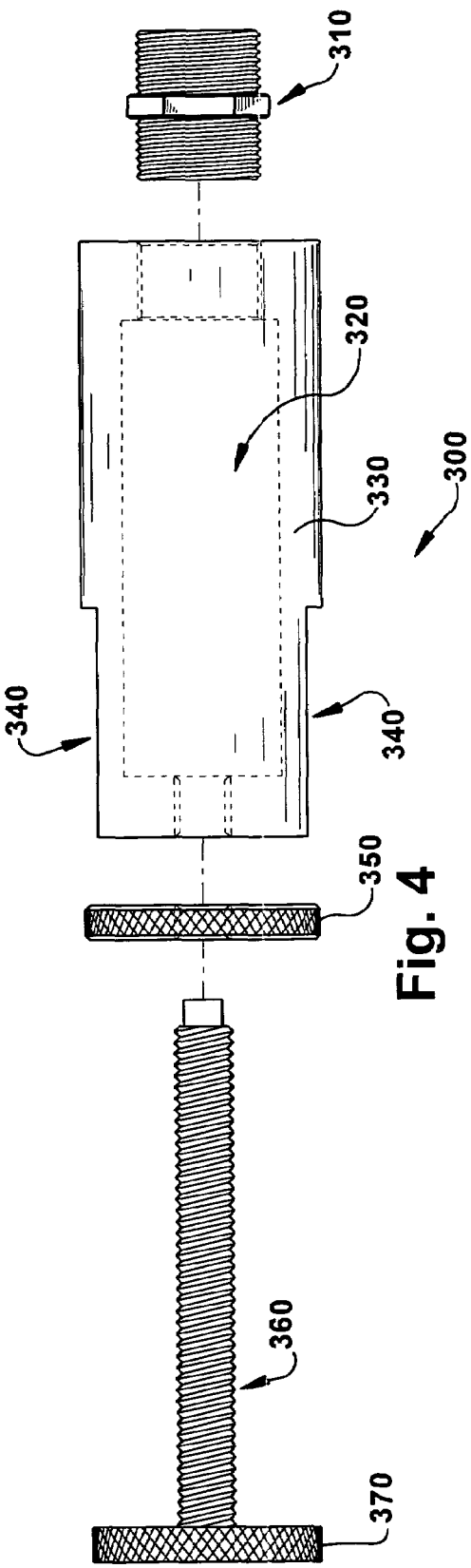

METHOD AND SYSTEM FOR INSERTING A PROBE

BACKGROUND OF THE INVENTION

The present application relates generally to a combustion system on a turbomachine; and more particularly to, a method and system for inserting a continuous dynamics monitoring probe about a combustion liner on a combustion gas turbine.

As part of the monitoring controls and diagnostic tools for a combustion system in a gas turbine, combustion dynamics data is typically measured and acquired. The combustion dynamics data is generally used to determine the operational health of the combustion system as a whole and also may be used to tune the combustion system to ensure operation within an appropriate balance between combustion dynamics and emissions.

Combustion dynamics monitoring systems are currently used on many classes of gas turbines. A dependable combustion measurement generally requires accurate and repeatable installation of the measurement tip of the dynamic probe of the combustion dynamics monitoring system. Improperly installed dynamics probes can lead to inaccurate readings of the combustor dynamics, possibly resulting in hardware damage and increased outages. Combustion dynamics monitoring systems typically use a depth-setting tool that assists with an accurate and repeatable installation of the dynamic probe.

There are a few possible problems with the currently known depth-setting tools. The combustion liner and flow sleeve designs vary among combustion systems. This requires a different depth setting tool for certain combustion systems. For example, but not limiting of the invention, some known depth setting tools cannot work with the combustion systems of certain combustion gas turbines sold by General Electric Company of Schenectady, N.Y. Specifically, these combustion systems include a movable ferrule located on a female bung that is attached to the combustion liner. The movable ferrule allows for current depth-setting tools to derive an inaccurate measurement of the required length of dynamics probe.

For the foregoing reasons, there is a need for a depth-setting tool that can accommodate the geometry of certain classes of turbines. The depth-setting tool should provide an accurate and repeatable installation of a combustion dynamics monitoring system probe and similar types of probes. The tool should include a taper about a tip that allows a user to easily manipulate the movable ferrule, thereby allowing for accurate placement of the tool within the flow sleeve and combustion liner. The tool should also include a tip appropriately sized to compensate for the differing dimensions of gas turbines. The tool should also include a target zone that ensures that the tool is properly inserted in the combustion can.

BRIEF DESCRIPTION OF THE INVENTION

In accordance with an embodiment of the present invention, a system for inserting a probe into a turbomachine, the system comprising: a male measurement fixture for inserting into at least one wall of the turbomachine, the male measurement fixture measures a probe insertion depth and comprises: a shaft, wherein the shaft includes a tip portion provided at a distal end of the shaft, and wherein the tip portion includes a taper near a distal end of the tip; at least one indicator for indicating the probe insertion depth on the shaft; at least one target zone for determining whether the male measurement fixture is correctly positioned within the at least one wall.

The system also comprises a female measurement fixture for transferring the probe insertion depth from the male measurement fixture to a probe holder device, the female measurement fixture comprises a housing defining a receptacle for receiving the shaft and the tip portion, wherein the receptacle is selectively adjustable to correspond to the probe insertion depth, and wherein the housing can receive the probe holder device in a manner to set the probe insertion depth on the probe holder device.

BRIEF DESCRIPTION OF THE DRAWING

FIG. 2 is a schematic exploded view, partly in cross-section, of a male measurement fixture in accordance with an embodiment of the present invention.

FIG. 4 is a schematic exploded view, partly in cross-section, of a female measurement fixture in accordance with an embodiment of the present invention.

DETAILED DESCRIPTION OF THE INVENTION

Certain terminology is used herein for convenience only and is not to be taken as a limitation on the invention. For example, words such as "upper," "lower," "left," "right," "horizontal," "vertical," "upward," and "downward" merely describe the configuration shown in the Figures. Indeed, the components may be oriented in any direction and the terminology, therefore, should be understood as encompassing such variations unless specified otherwise.

A probe holder device is a generic phrase for a combustion dynamics monitoring system assembly, which includes a probe that is positioned about the gas flow path within the combustion system. The probe holder device coupling is a generic phrase for a coupling or mounting hardware that secures the combustion dynamics monitoring assembly to a combustion can. In a combustion gas turbine (hereinafter turbine), the combustion dynamics monitoring (hereinafter CDM) probe assemblies should be mounted to the combustion can so that the probe tips are all disposed at a specific probe insertion depth. The probe insertion depth is the distance between the inside of the combustion liner and the combustion flow path, and is measured relative to a combustion liner surface. The probe insertion depth should be identical across all CDM probes used in the turbine.

To provide for reliable, repeatable probe insertions depths, an embodiment of the present invention includes a kit for determining the probe insertion depth relative to a combustor casing wall, a flow sleeve wall, and a liner wall. The kit includes a male measurement fixture (MMF) 150 (shown, for example, in FIG. 2) for measuring the probe insertion depth, and a female measurement fixture (FMF) 300 (shown, for example, in FIG. 4) for transferring the probe insertion depth to the CDM probe assembly 400. The MMF includes a tip portion 225 corresponding in axial length to probe insertion depth.

Figure 1:
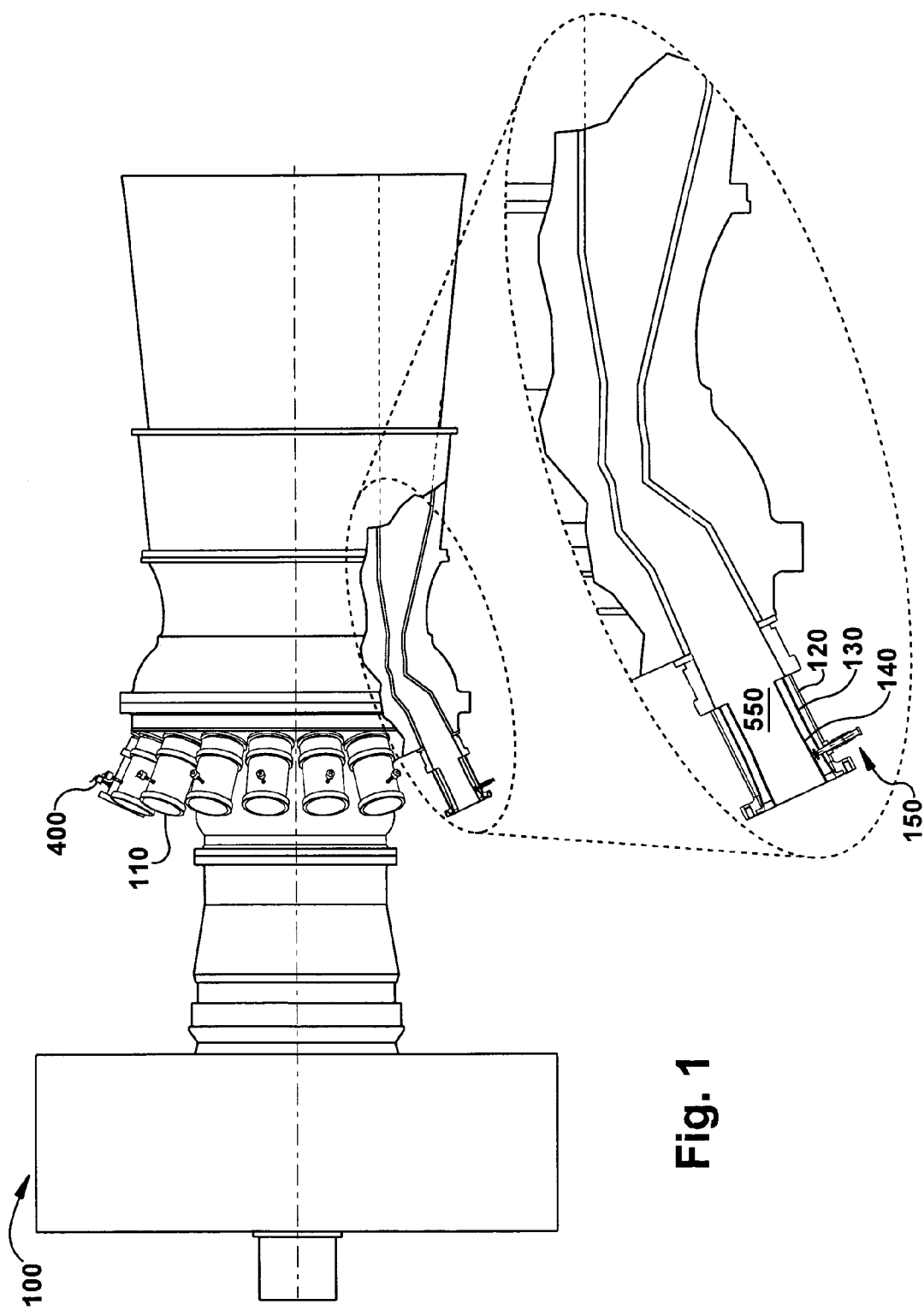
FIG. 1 is a schematic illustrating the environment in which an embodiment of the present invention operates.

Referring now to the figures, where the various numbers represent like parts throughout the several views, FIG. 1 is a schematic illustrating the environment in which an embodiment of the present invention operates. In FIG. 1, a turbine 100 includes a plurality of combustion cans 110. Each combustion can 110 comprises a first casing wall 120, a second flow sleeve wall 130, and a third liner wall 140. FIG. 1 also illustrates the MMF 150 inserted in the combustion can 110 for determining the probe insertion depth. As discussed, the probe insertion depth is determined relative to the liner wall 140 and the combustion flow path 550. FIG. 1 further illustrates that the method of the present invention affixes the CDM assembly 400 to each combustion can 110 at the proper probe insertion depth.

Referring now to FIG. 2, which is a schematic exploded view, partly in cross-section, of a male measurement fixture (MMF) 150 in accordance with an embodiment of the present invention. The MMF 150 includes a shaft 160, a head 170, and a lock nut 240 for locking a measurement barrel 250 in a target position.

Figure 3:
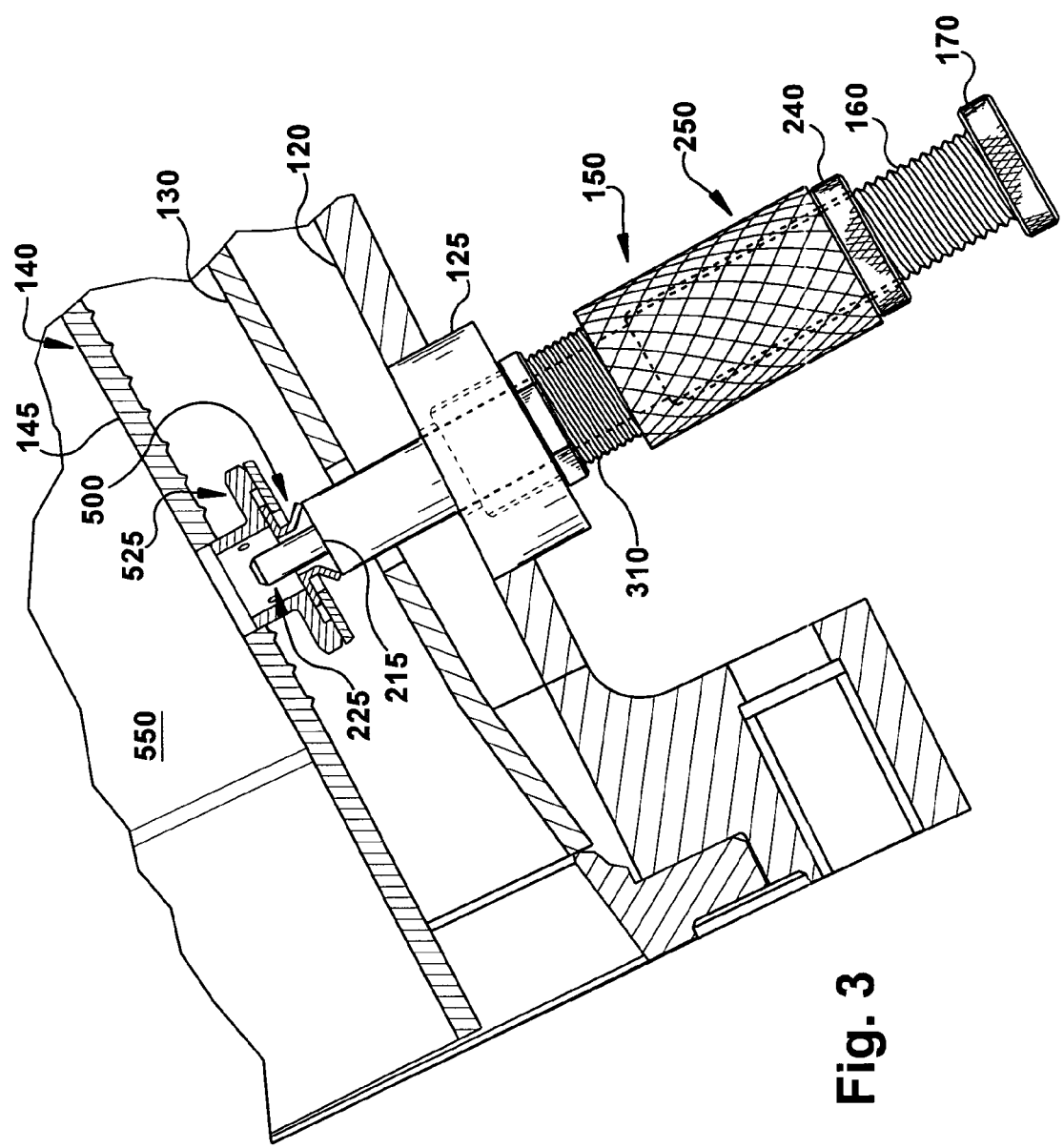
FIG. 3 is a schematic illustration of the step of measuring a target probe depth using the male measurement fixture of FIG. 2 in accordance with an embodiment of the present invention.

The shaft 160 may be an elongated body extending from the shoulder 215, defined by the difference in diameters of the shaft 160 and the tip portion 225, to the head 170. The tip portion 225 may be adapted to span the distance between a reference surface to an access/insertion point that is remote from the reference surface e.g., from the liner wall 140 through the flow sleeve wall 130, and through the casing wall 120, and beyond a casing coupling 125 provided on the casing wall 120 for coupling the CDM assembly 400 to the casing wall 120 (the aforementioned is illustrated in FIG. 3). For example, but not limiting of the invention, the casing coupling 125 used for access/insertion point may be a Swagelok® (Swagelok is a registered trademark of Swagelok corporation of Solon, Ohio) fitting, or the like. However, the present invention is not intended to be limited to only those types of coupling devices.

The tip portion 225 may correspond in axial length to a desired or target probe insertion depth inwardly with respect to a reference surface, which in the present embodiment is the outer surface 145 of the liner wall 140 (shown in FIG. 3). The tip portion 225 includes a taper 230 that aids the user in manipulating the movable ferrule assembly 500 that may rest on the female bung 525, shown in FIG. 3. The length of the tip portion 225 may be fixed or, if adjustment is desired, the length may be varied. For example, but not limiting of the invention, a specific length may be required for a certain gas turbine having a distinct combustion system, and a different length may required for the same gas turbine having a second distinct combustion system. The length may be changed, for example, but not limiting of the invention, by providing a threaded tip portion that may be lengthened or shortened; alternatively interchangeable tip portions may also be used to change the length.

The shaft 160 also includes an unthreaded portion 190 and may comprise a target zone 195, an upper limit 200, and a lower limit 205. The unthreaded portion extends from the shoulder 215 to the threaded portion 180. The target zone 195 allows a user to clearly gauge whether the MMF fixture 150 is properly inserted in the combustion can 110. Hence, the target zone 195 may determine whether the operator is correctly measuring the probe insertion depth. The breadth of the target zone 195 may be bound an upper limit 200 and a lower limit 205. For ease of use, the upper limit 200 and the lower limit 205 may be machined into the unthreaded portion 190. For example, but not limiting of the invention, if an operator, after inserting the MMF 150 into a combustion can 110, can see both the upper limit 200 and the lower limit 205, then a portion of the MMF 150 may be caught on either the flow sleeve wall 130 or on the movable ferrule assembly 500 (shown in FIG. 3). Moreover, if an operator cannot see the upper limit 200 and the lower limit 205, then the MMF 150 may be inserted too far and the shoulder 215 may be resting on a sloped side (not shown) of the movable ferrule assembly 500. It is to be understood, however, that if the target zone 195 is indicated, recorded or marked on the MMF 150 in another manner, such as by noting indicia or solely by the position of the distal face of the measurement barrel 250, then the threaded portion 180 may extended along a greater extent of the shaft 160 length or along substantially the entire length of the shaft 160.

The measurement barrel 250 has an inner bore including a barrel smooth surface portion 260 and a barrel threaded portion 255. The barrel smooth surface portion 260 is provided to slidably engage the unthreaded portion 190 of the shaft 160, whereas the barrel threaded portion 255 is adapted to threadably engage the threaded portion 180 of the shaft 160. Providing a barrel smooth surface portion 260, as illustrated in FIG. 2, limits the proximal displacement of the measurement barrel 250 with respect to the unthreaded portion 190 of the shaft 160. It is to be understood, however, that the inner diameter of the barrel smooth portion 260 may be an optional feature of the MMF 150.

In an embodiment of the present invention, the MMF 150 is about 8 inches long, the tip portion 225 is from about 0.37 to about 1.25 inches long, and the threaded portion 180 is about 2.5 inches long. Furthermore, in an embodiment of the present invention, the diameter of the tip portion 225 is about 0.3 inches and the diameter of the unthreaded portion 190 is about 0.8 inches.

A head 170 is provided at the proximal end of the MMF 150 for retaining the measurement barrel 250 and lock nut 240 on the shaft 160. In a non-limiting embodiment of the present invention, the head 170 has an outer diameter of about 1.2 inches, however, the head 170 may have an outer diameter of any size, and may have a knurled surface to facilitate handling.

The measurement barrel 250 may advantageously have a total length generally corresponding to the length of the threaded portion 180. The barrel threaded portion 255 is generally an inner bore of the measurement barrel 250 threaded less than the total length of the measurement barrel 250 by an amount generally corresponding to the length of the lock nut 240. For example, but not limiting of the invention, if the lock nut 240 has a length of about 0.3 inches, the barrel-threaded portion 255 is about 1.7 inches. Here, when the measurement barrel 250 is fully engaged with the threaded portion of the MMF 150 and the lock nut 240 is interposed between the measurement barrel 250 and the head 170 of the shaft 160, the threaded portion 180 may be fully covered and the measurement barrel 250 should project distally from the threaded portion 180.

Referring now to FIG. 3, which is a schematic illustration of the step of measuring a probe insertion depth using the MMF 150 of FIG. 2, in accordance with an embodiment of the present invention. Here, the MMF 150 is inserted through the casing coupling 125 opening provided on the combustor can 110 to dispose the tip portion 225 near the outer surface 145 defined in the combustion liner wall 140. The MMF 150 is advanced until the shoulder 215 engages the movable ferrule 500, which may be connected to the female bung 525. Here, and as illustrated in FIG. 3, an aft end of the measurement barrel 250 may engage a distal end of the connection 310, and the aft end of the connector 310 may engage at least one distal surface of the casing coupling 125. As discussed, the tip portion 225 advantageously has a length corresponding to the distance that the CDM tip 420 desirably extends inwardly from the outer surface 145 of the liner wall 140. This distance will generally correspond to the liner wall 140 thickness.

The measured probe insertion depth is then indicated, recorded, or marked on the MMF 150 at a predetermined point with respect to the combustor casing wall 120. Thus, once the MMF 150 is inserted so that the shoulder 215 abuts the movable ferrule assembly 500, the measurement barrel 250 is rotated to advance distally. After the measurement barrel 250 is in position to indicate the probe insertion depth, the lock nut 240 is advanced distally to lock the measurement barrel 250 in place. The outer surfaces of the measurement barrel 250 and lock nut 240 may be knurled to facilitate manipulation.

It is to be understood that the MMF 150 may be marked to indicate the probe insertion depth. For example, but not limiting the invention, indicia may be applied to the MMF 150 as by applying a physical mark, tape, or the like to indicate the determined probe insertion depth with respect to the combustor casing wall 120.

Referring now to FIG. 4, which is a schematic exploded view, partly in cross-section, of a female measurement fixture (FMF) 300 in accordance with an embodiment of the present invention. The FMF 300 is provided for transferring the probe insertion depth as determined by the MMF 150 ultimately to the CDM probe assembly 400. As illustrated in FIG. 4, the FMF 300 includes at a first, open end thereof, a connector 310 corresponding to the casing coupling 125 provided on the combustor casing wall 120, shown for example in FIG. 3. The FMF 300 includes a receptacle 320 having an adjustable cavity area to correspond to the probe insertion depth as determined by the MMF 150. In an embodiment of the present invention, the size of the cavity in the receptacle 320 may be adjusted by the adjustment bolt 360, which is threadably engaged within the housing 330. The adjustment bolt 360 includes an adjustment head 370, which may include a knurled surface. The adjustment head 370 may be used to facilitate the displacement of the adjustment bolt 360 with respect to the housing 330. A lock ring 350 is further provided for locking the adjustment bolt 360 with respect to the housing 330. The housing 330 may include at least one flat face 340 for clamping the housing 330 to a structure during use.

Figure 5:
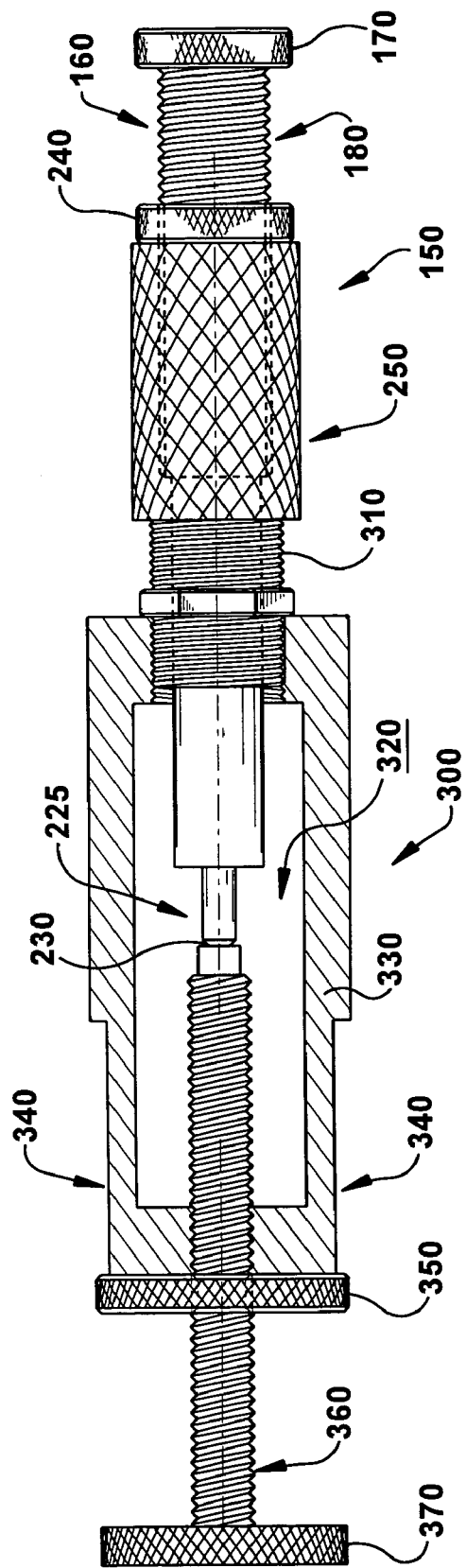
FIG. 5 is a schematic view in cross-section showing the transfer of the probe insertion depth from a male measurement fixture to a female measurement fixture in accordance with an embodiment of the present invention.

Referring now to FIG. 5, which is a schematic view in cross-section showing the transfer of the probe insertion depth from a male measurement fixture to a female measurement fixture in accordance with an embodiment of the present invention. The MMF 150 set to the probe insertion depth is slidably inserted through the connector structure 310 into the MMF 300 until the indicator thereof is aligned with a complimentary portion or feature provided on the connector 310. In an embodiment of the present invention, the measurement barrel 250 is used to the mark probe insertion depth on the MMF 150. The adjustment bolt 360 is then adjusted so that the tip portion 230 of the MMF 150 engages the adjust bolt 360. The lock ring 350 is then tightened to lock the new position of the adjustment bolt 360. This new position is the probe insertion depth position as transferred from the MMF 150.

Figure 6:
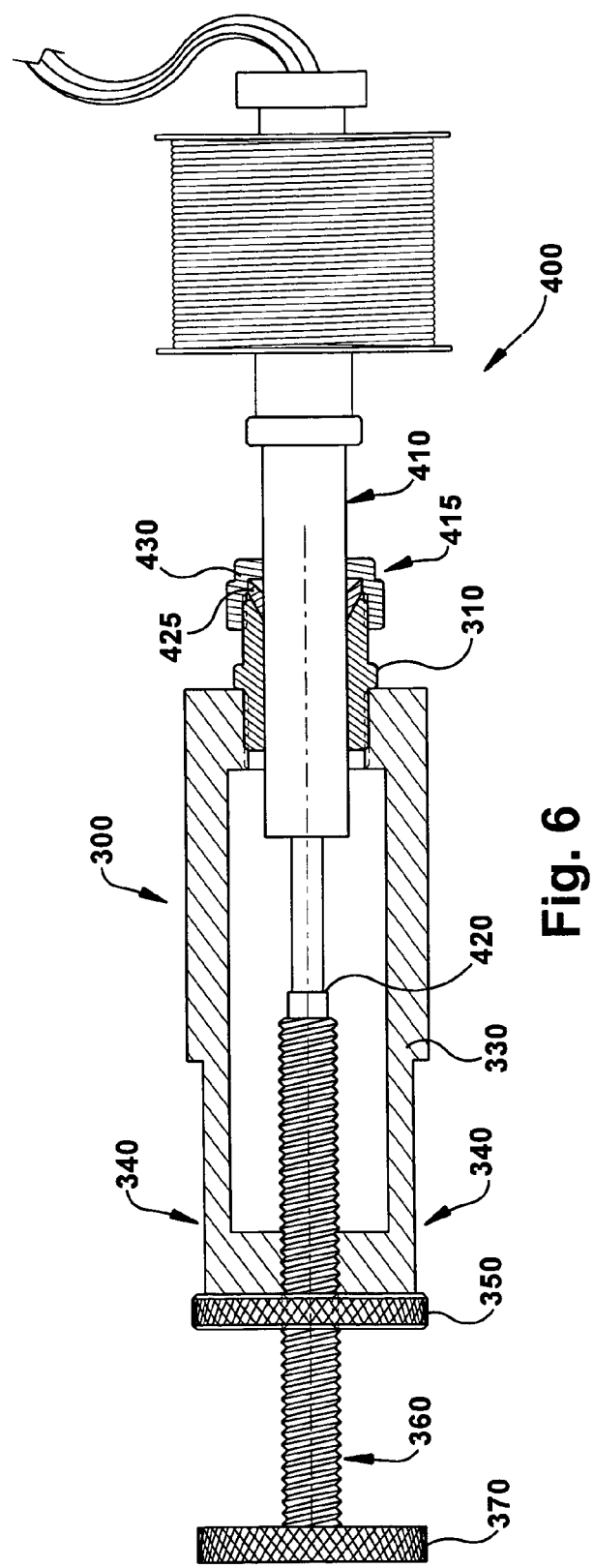
FIG. 6 is a schematic in cross-section showing the transfer of the target probe depth from a female measurement fixture to a probe holder device in accordance with an embodiment of the present invention.
Figure 7:
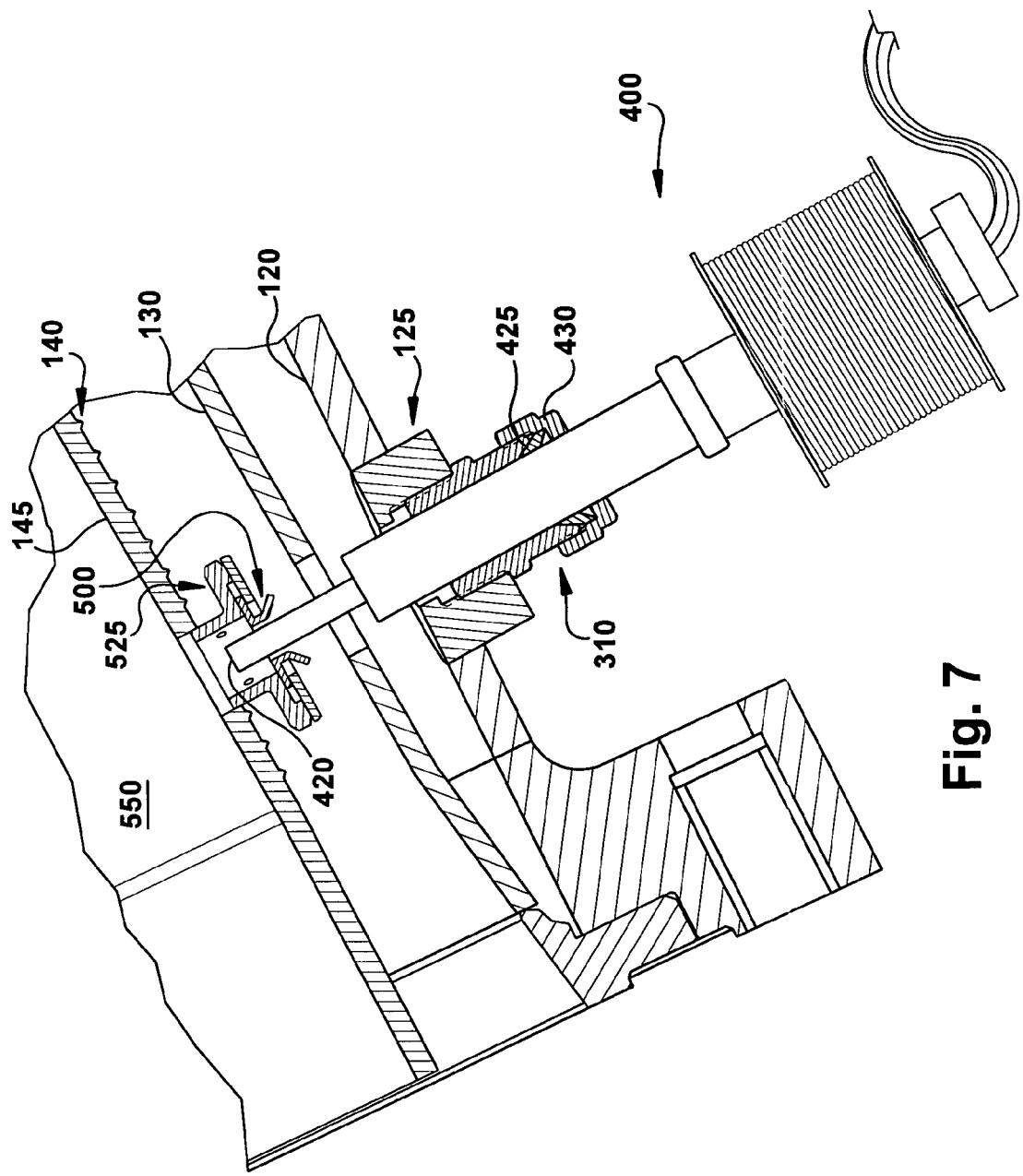
FIG. 7 is a schematic illustration of the probe holder device installed in a gas turbine combustion can.

After the lock ring 350 locks the position of the adjustment bolt 360, the MMF 150 may be removed so the FMF 300 can mark the probe insertion depth on the CDM probe assembly 400. More particularly, referring now to FIG. 6, which is a schematic in cross-section showing the transfer of the probe insertion depth from the FMF 300 to a CDM probe assembly 400 in accordance with an embodiment of the present invention. The CDM probe assembly 400 is inserted through the connector structure 310 such that the CDM tip 420 abuts the adjustment bolt 360. While the CDM probe assembly 400 is so disposed, at least one ferrule 425 and at least one collar 430 is displaced so as to align with the connector 310 of the FMF 330. The CDM connector assembly 415 may then be tightened to lock the at least one ferrule 425 in place at the correct position on the CDM shaft 410. With the probe insertion depth recorded or marked on the CDM probe assembly 400, the connector 310 can be released and the assembly 400 removed for engagement in due course with the combustion casing wall 120. Since the ferrule 425 has been locked in position on the CDM shaft 410, when the CDM probe assembly 400 is inserted through the casing coupling 125, as shown in FIG. 7, engagement of the at least one locked ferrule 425 and the at least one collar 430, with the casing coupling 125 indicates that the CDM tip 420 is properly disposed with respect to the liner wall 140.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A system for inserting a probe into a turbomachine, the system comprising:
   a male measurement fixture for inserting into at least one wall of the turbomachine, the male measurement fixture measures a probe insertion depth and comprises:
   a shaft, wherein the shaft includes a tip portion provided at a distal end of the shaft, and wherein the tip portion includes a taper near a distal end of the tip;
   at least one indicator for indicating the probe insertion depth on the shaft;
   at least one target zone for determining whether the male measurement fixture is correctly positioned within the at least one wall; and
   a female measurement fixture for transferring the probe insertion depth from the male measurement fixture to a probe holder device, the female measurement fixture comprises a housing defining a receptacle for receiving the shaft and the tip portion, wherein the receptacle is selectively adjustable to correspond to the probe insertion depth, and wherein the housing can receive the probe holder device in a manner to set the probe insertion depth on the probe holder device.

2. The system of claim 1, wherein the tip portion has a diameter less than the shaft.

3. The system of claim 2, further comprising a shoulder defined between the tip portion and the shaft.

4. The system of claim 1, wherein the indicator comprises a measurement barrel mounted to the shaft, and wherein the measurement barrel functions to be selectively axially shifted on the shaft.

5. The system of claim 4, further comprising a lock nut for locking the measurement barrel in position.

6. The system of claim 1, wherein the shaft includes an unthreaded portion and a threaded portion, and wherein the measurement barrel is disposed on the threaded portion.

7. The system of claim 1, wherein the indicator comprises at least one ferrule slidably disposed on the shaft and at least one collar slidably disposed on the shaft.

8. The system of claim 7, wherein the at least one ferrule and the at least one collar are slidably disposed on the unthreaded portion of the shaft.

9. The system of claim 1, wherein the taper aids with the insertion of the tip into the at least one wall of the turbomachine.

10. The system of claim 9, wherein the taper maneuvers a movable ferrule attached to a female bung, and wherein the female bung is attached to the at least one wall.

11. The system of claim 1, wherein the at least one wall comprises a first liner wall, a second flow sleeve wall, and a third casing wall and wherein the tip portion of the male measurement fixture has a length corresponding to a target length of a probe tip as determined inwardly from an outer surface of the liner wall.

12. The system of claim 1, wherein the tip portion comprises a length of about 0.370 inches (about 9.398 millimeters) to about 1.250 inches (about 19.05 millimeters).

13. The system of claim 1, further comprising a connection coupling located near an open end of the receptacle of the female measurement fixture, wherein the connection coupling corresponds to a probe holder device coupling provided on it least one wall.

14. The system of claim 1, wherein the target zone is bounded by at least two limiters.

15. The system of claim 14, wherein the at least two limiters are machined into the shaft.

16. The system of claim 1, wherein an axial depth bolt adjustably mounted to the housing determines a depth of the receptacle.

17. The system of claim 1, wherein the tip portion comprises a variable length.

18. The system of claim 17, wherein the tip portion comprises a threaded portion, and wherein the threaded portion is used to set the length of the tip portion.

19. The system of claim 1, wherein the tip portion comprises a distinct length.

20. The system of claim 19, wherein a second tip portion comprises a second distinct length replaces the tip portion.

* * * * *